US008966273B2

(12) United States Patent
Hwang et al.

(10) Patent No.: US 8,966,273 B2
(45) Date of Patent: Feb. 24, 2015

(54) LIGHTWEIGHT GROUP SIGNATURE SYSTEM AND METHOD WITH SHORT SIGNATURE

(75) Inventors: Jung Yeon Hwang, Daejeon-si (KR); Dowon Hong, Daejeon (KR); Ku-Young Chang, Daejeon (KR); Jeong Woon Choi, Yongin-si (KR); Nam Su Jho, Daejeon (KR); Taek Young Youn, Seongnam-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 42 days.

(21) Appl. No.: 13/605,735

(22) Filed: Sep. 6, 2012

(65) Prior Publication Data

US 2013/0091360 A1     Apr. 11, 2013

(30) Foreign Application Priority Data

Oct. 11, 2011 (KR) .................... 10-2011-0103670

(51) Int. Cl.
*H04L 9/32*  (2006.01)
(52) U.S. Cl.
CPC ......... *H04L 9/3255* (2013.01); *H04L 2209/805* (2013.01)
USPC .......................................... 713/176; 177/180
(58) Field of Classification Search
USPC ........................................................ 713/176
See application file for complete search history.

(56) References Cited

U.S. PATENT DOCUMENTS

| 6,295,359 | B1 * | 9/2001 | Cordery et al. ............. 380/44 |
| 7,844,614 | B2 * | 11/2010 | Brickell et al. ............ 707/756 |
| 7,945,044 | B2 * | 5/2011 | Sorniotti et al. ............ 380/28 |
| 7,995,762 | B2 * | 8/2011 | Teranishi et al. ........... 380/278 |
| 8,078,876 | B2 * | 12/2011 | Brickell et al. ............ 713/176 |
| 8,094,810 | B2 * | 1/2012 | Hohenberger et al. ....... 380/28 |
| 8,127,140 | B2 * | 2/2012 | Teranishi .................. 713/180 |
| 8,213,609 | B2 * | 7/2012 | Kusakawa et al. .......... 380/44 |
| 8,225,098 | B2 * | 7/2012 | Chen ........................ 713/176 |
| 8,245,047 | B2 * | 8/2012 | Zaccone et al. ............ 713/180 |
| 8,356,181 | B2 * | 1/2013 | Brickell et al. ............ 713/180 |
| 8,499,149 | B2 * | 7/2013 | Chen ........................ 713/158 |
| 8,499,158 | B2 * | 7/2013 | Lee et al. .................. 713/176 |
| 8,572,385 | B2 * | 10/2013 | Papamanthou et al. ..... 713/171 |
| 8,645,690 | B2 * | 2/2014 | Lee et al. .................. 713/168 |
| 8,762,729 | B2 * | 6/2014 | Hwang et al. ............. 713/176 |
| 2004/0111607 | A1 * | 6/2004 | Yellepeddy ................ 713/155 |
| 2005/0097336 | A1 * | 5/2005 | Canard et al. ............. 713/185 |
| 2005/0169461 | A1 * | 8/2005 | Canard et al. ............. 380/28 |

(Continued)

OTHER PUBLICATIONS

Dan Boneh et al., "Short Group Signatures", CRYPTO 2004, 2004, pp. 1-20.

*Primary Examiner* — Azizul Choudhury
*Assistant Examiner* — Tariq Najee-Ullah (57) ABSTRACT

A lightweight group signature system and method with short signatures according to the exemplary embodiments of the present invention can provide security characteristics similar to group signature mechanisms providing the existing known controllable linkability but can make a revocation method simple by outputting a short signature and providing excellent operation efficiency at the time of signature generation, signature verification, and revocation on smart terminals, and can be widely applied to various anonymity-based application environments, making by making operation efficiency excellent at the time of signature generation and verification and outputting very short signature lengths.

12 Claims, 8 Drawing Sheets

(56) References Cited

U.S. PATENT DOCUMENTS

| | | |
|---|---|---|
| 2008/0152130 A1 | 6/2008 | Teranishi |
| 2008/0244276 A1* | 10/2008 | Prouff et al. ............ 713/193 |
| 2009/0089575 A1* | 4/2009 | Yonezawa et al. ........ 713/156 |
| 2009/0210705 A1* | 8/2009 | Chen ....................... 713/158 |
| 2009/0222668 A1* | 9/2009 | Zaccone et al. .......... 713/179 |
| 2010/0174911 A1* | 7/2010 | Isshiki .................... 713/182 |
| 2010/0250951 A1* | 9/2010 | Ueno et al. ............... 713/176 |
| 2011/0154045 A1* | 6/2011 | Lee et al. ................. 713/176 |
| 2012/0084567 A1* | 4/2012 | Hwang et al. ............ 713/176 |
| 2012/0159166 A1* | 6/2012 | Lee et al. ................. 713/168 |

* cited by examiner

LIGHTWEIGHT GROUP SIGNATURE SYSTEM AND METHOD WITH SHORT SIGNATURE

CROSS-REFERENCE TO RELATED APPLICATIONS

This application claims priority to and the benefit of Korean Patent Application No. 10-2011-0103670 filed in the Korean Intellectual Property Office on Oct. 11, 2011, the entire contents of which are incorporated herein by reference.

TECHNICAL FIELD

The present invention relates to a lightweight group signature system and method with short signatures, and more particularly, to a lightweight group signature system and method with short signatures, which can be effectively operated on a lightweight smart terminal.

BACKGROUND ART

A group signature mechanism, which is one of the very important cryptographic authentication mechanisms for protecting user's privacy, has been widely researched and has been considerably developed since the concept thereof is first proposed by Chaum and Heyst in 1991. Various security requirements, formal models, and detailed mechanisms have been proposed. Recently, a group signature mechanism providing controllable linkability by extending typical group signature mechanisms has been researched.

Typical authentication mechanisms, such as an ID/password authentication mechanism, a real-name based PKI authentication mechanism, and an i-Pin mechanism, and the like, have many disadvantages, such as personal information exposure due to a registration and identification process of personal information, leakage due to excessive personal information collection and management carelessness of a service provider, a wide range of activity trace, and the like. As a result, a group signature mechanism providing controllable linkability as an effective anonymous authentication mechanism that can replace the above-mentioned mechanisms has been actively researched recently.

The group signature mechanism providing controllable linkability additionally has controllable linkability capable of identifying that group signatures are linked with each other (that is, the group signatures are generated by one signer or a signer key) when a special linking key is provided, by extending the typical group signature mechanisms simply handling anonymity using a dichotomical structure that conceals/recovers identity information or ID of a signer. Therefore, the anonymity can be controlled to various levels according to the desired policy.

Using the characteristics, a service provider can obtain user related effective information from various anonymity based services, for example, web based personalized anonymous authentication service or in the case of data mining, anonymous authentication data, while maintaining anonymity of identity information.

Existing group signature mechanisms providing various security characteristics such as the known controllable linkability, and the like, cannot be widely adopted in various application environments due to structural complexity. Currently, user storage costs and operation costs are very cheap. Therefore, costs of resources for designing the system greatly depends on communication costs and therefore, the group signature mechanism providing controllable linkability with short signatures is urgently required in low resource application environments such as a radio Internet based service market.

Recently, application mechanisms for enhancing privacy protection by performing anonymous authentication between the smart terminals by using short range communication environment, and the like, have been researched and developed.

As an example, a method for transmitting information using multi-dimensional codes such as a QR code has been greatly interested as one method of short range communications. A device with a built-in camera capable of recognizing the multi-dimensional code can obtain information through the multi-dimensional codes any time and therefore, the user can process information using the corresponding devices without separate communication networks (thus, without charging communication costs). The method for recognizing multi-dimensional codes through a camera is performed by a contactless type and therefore, does not require devices such as a separate connection cable, and the like.

SUMMARY OF THE INVENTION

In order to solve the above problems, the present inventors have developed the lightweight group signature mechanism, and the like, that is excellent in terms of performance, in particular, outputs short signatures and has the excellent security characteristics while providing excellent operation efficiency at the time of signature generation and signature verification on the smart terminals.

The present invention has been made in an effort to provide a lightweight group signature system and method with short signatures capable of providing excellent operation efficiency at the time of signature generation, signature verification, and revocation on smart terminals while providing security characteristics similar to group signature mechanisms providing the existing known controllable linkability but outputting the short signatures.

An exemplary embodiment of the present invention provides a lightweight group signature system with short signatures, may include: a signature control unit configured to generate a group public key, issue a signature key to a user device, store the signature key in a signature key management list, and update related information including the signature key management list when validity of a join request generated from the user device is verified, identify whether two signatures are linked and manage a revocation list to perform revocation and generate a signer identification proof when a valid signature is; a user device configured to generate a signature using a signature key issued from the signature control unit; a signature verifying unit configured to verify a signature generated from the user device; signer identification proof evaluating unit configured to evaluate the validity of the signer identification proof generated from the signature control unit.

The signature control unit may include: a key issuing unit configured to generate a group public key, a master issuing key, a master opening key, and a master linking key based thereon, issue the signature key to the user device when a join of the user device is requested, and manage a revocation list so as to be used to update the signature key when the revocation of the issued signature key is performed; a signer identifying unit configured to identify the validity of a signature key generating a signature and generate the signer identification proof by using the master opening key when the valid signature is given; and a signature linking unit configured to identify whether two signatures are linked with each other by using the master linking key when two valid signatures are present.

The key issuing unit may provide the generated group public key to all the participants including the user device.

The key issuing unit may define the master issuing key by using (algebraic) bilinear groups and a bilinear map associated with the bilinear groups.

The key issuing unit may verify the validity of a join request message when receiving the join request message from the user device to be registered in the lightweight group signature system and then, issues the signature key to the user device.

The join request message may include personal key ownership verification information and verification information related to key issuance.

A security channel for authentication may be formed between the key issuing unit and the user device.

The key issuing unit may change a session at the time of generating a revocation list of issued signature keys and make public the revocation list to be used to update the group public key and a user secret key.

The signer identifying unit may output a proof identifying who is a signer by using the master opening key when the valid signature is given.

Another exemplary embodiment of the present invention provides a lightweight group signature method, including: generating a group public key and generating a master secret key, a master opening key, and a master linking key based thereon; verifying the validity of user information after receiving user information required to join a signature group from a user device when a join is requested from the user device, issuing a signature key by using the master secret key when the verification is valid, and generating the signature; and searching registration information including a public key of the user device, calculating validity of the signature by using the master opening key, the signature, and related information, and determining whether revocation of the signature is performed according to whether the calculating results are present in the revocation list.

The generating of the signature may further include: verifying the validity of the join request message by receiving a join request message from the user device; receiving a signature for the join request message of which the validity is verified from the user device; generating a secret signature key corresponding to a group public key in the user device by verifying the validity of the signature and registering the user device; and providing the generated group public key to the user device registered in the group signature system.

The determining whether the revocation of the signature is performed may further include identifying whether two signatures are linked with each other by using the master linking key when two valid signatures are given.

The determining whether the revocation of the signature is performed may further include providing the identifying result of the revocation to the user device when the revocation identification for the given signature is requested The master issuing key may be defined by using bilinear groups, a bilinear map associated with the bilinear groups, and a hash function.

The join request message may include a personal key ownership verification information.

The lightweight group signature system and method with short signatures according to the exemplary embodiments of the present invention can make the revocation method simple and can be widely applied to various anonymity-based application environments such as the multi-dimensional code based authentication, and the like, by providing the excellent operation efficiency at the time of the signature generation and verification and outputting the very short signature length.

The lightweight group signature system and method with short signatures according to the exemplary embodiments of the present invention can provide unforgeability, traceability, non-frameability, controllable anonymity, and controllable linkability to systemically control the degree of anonymity.

The lightweight group signature system and method with short signatures according to the exemplary embodiments of the present invention can be used for applications to which the existing group signature mechanisms, such as anonymous authentication for traffic network, future Internet anonymous packet authentication, and the like, are applied, and various next-generation IT applications such as anonymous based web services, medical information security, cloud computing authentication, and the like, and can be used on the smart terminals.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example,

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention, and terms described in the singular form may include a plural concept. Hereinafter, exemplary embodiments of the present invention will be described, but the spirit of the present invention is not limited thereto and may be changed and modified in various ways by those skilled in the art.

Figure 1:
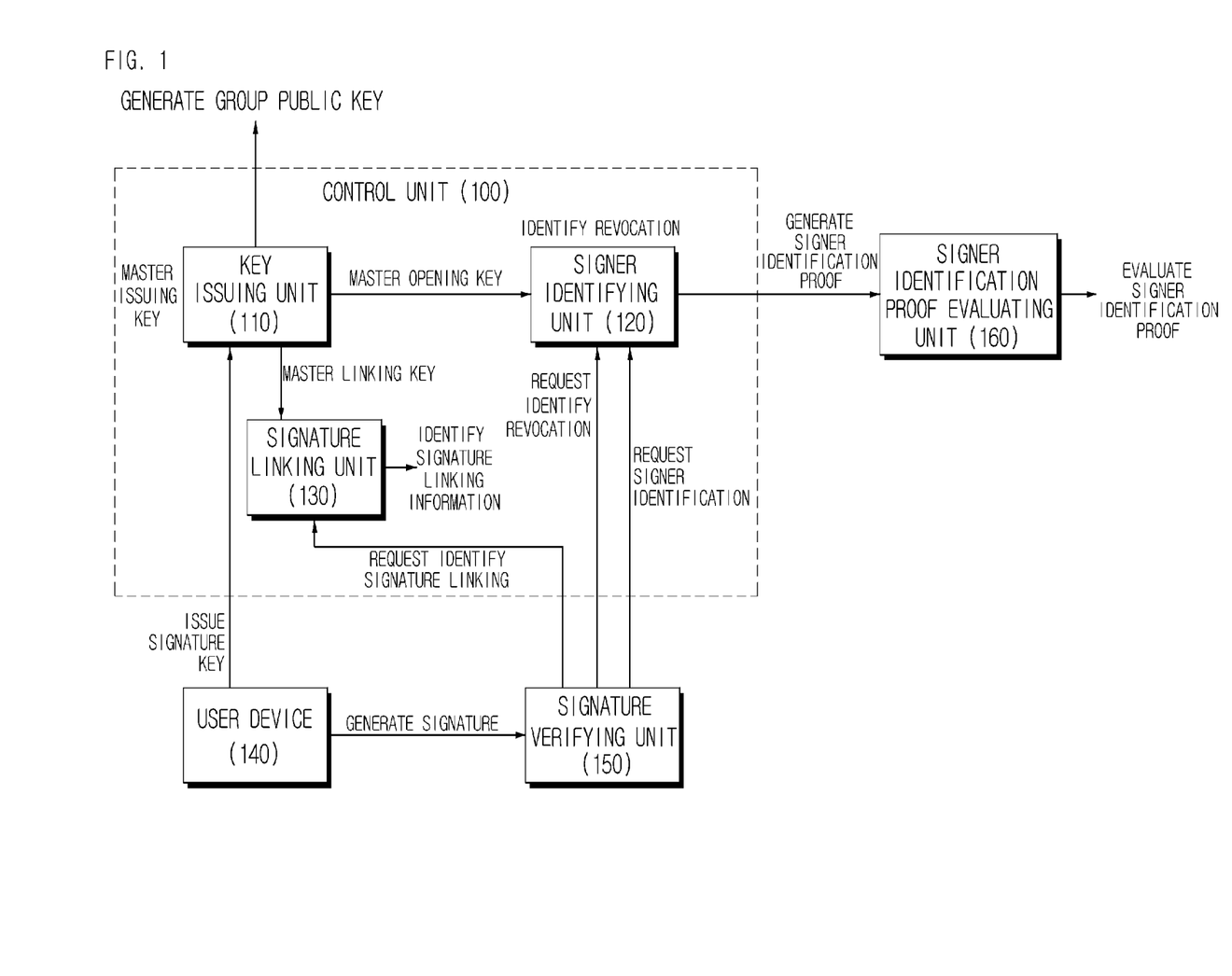
FIG. 1 is a configuration diagram of a lightweight group signature system with short signature lengths according to an exemplary embodiment of the present invention.

FIG. 1 shows a configuration of a lightweight group signature system with short signature lengths according to an exemplary embodiment of the present invention.

Referring to FIG. 1, a lightweight group signature system according to an exemplary embodiment of the present invention includes a signature control unit 100 including a key issuing unit 110, a signer identifying unit 120, and a signature linking unit 130, a signature verifying unit 150, and a signer identification proof evaluating unit 160. Here, each component of the signature control unit 100 can be implemented by a software algorithm that outputs special values for given input values. However, each component is not limited thereto and a role of participants may be flexibly separated or integrated based on definition of a new subject according to a designed method. If necessary, it is possible to add new components for linking with known real-name authentication mechanisms. Herein, examples of the integration may also include the integration of the key issuing unit 110 and the integration of the signer identifying unit 120 or the integration of the signer identifying unit 120 and the signature linking unit 130.

The key issuing unit 110 initially generates the group public key as a trusted subject and generates a master issuing key (mik), a master opening key (mok), and a master linking key (mlk) corresponding thereto.

The key issuing unit 110 performs an interactive protocol when receiving a join request from a new user device 140 and then, issues a signature key to the user device.

The signer identifying unit 120 updates related information including a revocation list when a revocation phenomenon occurs. If the signer identifying unit 120 identifies whether revocation is performed, by using the updated revocation list and the master opening key when the revocation identification request is received from the signature verifying unit 150 and then, returns the identified results to the signature verifying unit 150.

The signer identifying unit 120 uses the master opening key to output the verification information for identifying a signer when a valid signature is given. Anyone can publicly identify the output verification information.

The signature linking unit 100 can identify a linking relationship of two signatures by using the master linking key when two valid signatures are given. That is, it can be appreciated whether a single signer generates two signatures.

The user device 140 may be joined in a member of a valid group to receive a signature key from the key issuing unit 110. In this case, the user device 140 and the key issuing unit 110 perform an interactive protocol.

Thereafter, the user device 140 generates a group signature for a given message by using an issued signature key. The signature verifying unit 150 identifies validity of a signature for the given signature. The signer identification proof evaluating unit 160 evaluates the validity of the signer identification proof generated from the signer identifying unit 120.

The key issuing unit 110 defines a group public key (gpk) and makes public the defined group public key to components of the lightweight group signature system and all the systems linked with the lightweight group signature system.

Figure 2:
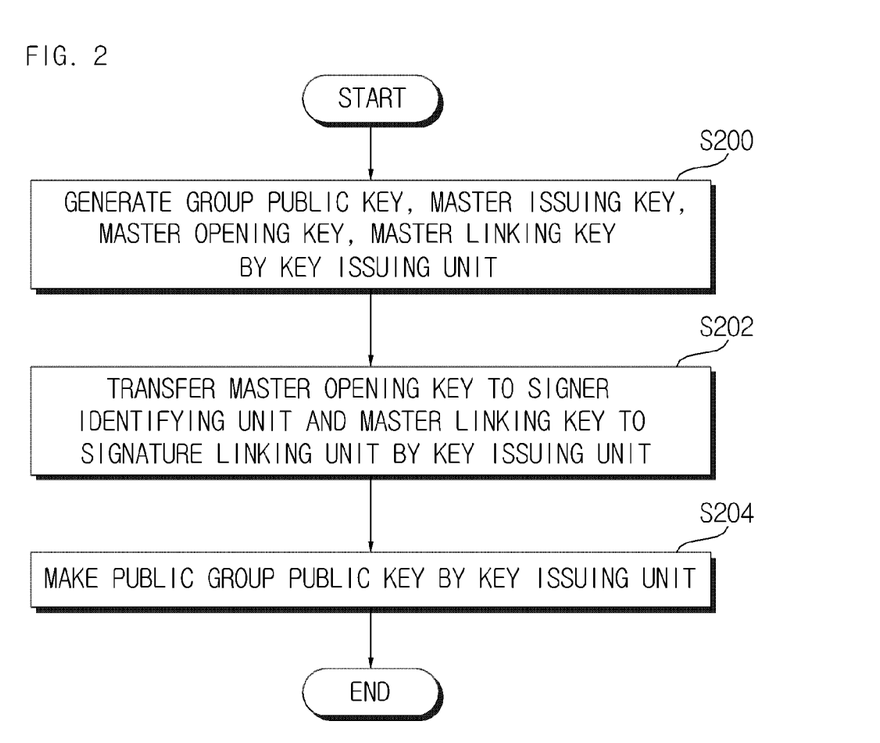
FIG. 2 is an operational control flow chart of generating a group public key, a master issuing key, a master opening key, and a master linking key of a group signature system according to an exemplary embodiment of the present invention.

FIG. 2 is an operational control flow chart of allowing the key issuing unit 110 according to an exemplary embodiment of the present invention to generate an initial group public key (gpk), the master issuing key (mik) corresponding to the initial group public key, the master opening key (mok), and the master linking key (mlk).

Hereinafter, referring to FIG. 2, an operational process of the key issuing unit 10(110) according to the exemplary embodiment of the present invention will be described in detail.

Initially, the key issuing unit 110 receives a security parameter k as an input to generate bilinear groups $G_1$ and $G_2$, a bilinear map $e: G_1 \times G_2 \to G_T$ coupled therewith, and a hash function $H: \{0,1\}^* \to Z_p^*$. Here, the number of groups is set to be a decimal p. The key issuing unit 110 performs the followings so as to generate parameters for generating the keys according to each group signature mechanism.

Elements $h_1 \in G_2$ and $g, g_1, g_2, u \in G_1$ and $\theta \in Z_p^*$ and $\eta, \xi \in Z_p^*$ are selected uniformly at random. After $h_\theta = h_1^\theta$, $w = u^\eta$, $d = u^\xi$ is calculated, mik=$\theta$ is defined as the master issuing key, mok=$(\eta, \xi)$ is defined as the master opening key, and mlk=$L=h_1^\xi$ is defined as the master linking key, respectively (S200).

The key issuing unit 110 transfers the master opening key mok=$(\eta, \xi)$ to an identifier server and transfers the master linking key mlk=$L=h_1^\xi$ to a linker unit 130 (S202).

The key issuing unit 110 generates an initial group public key gpk=$(e, G_1, G_2, G_T, g, g_1, g_2, h_1, h_e, H, u, w, d)$ and make the generated key public (S204).

Figure 3:
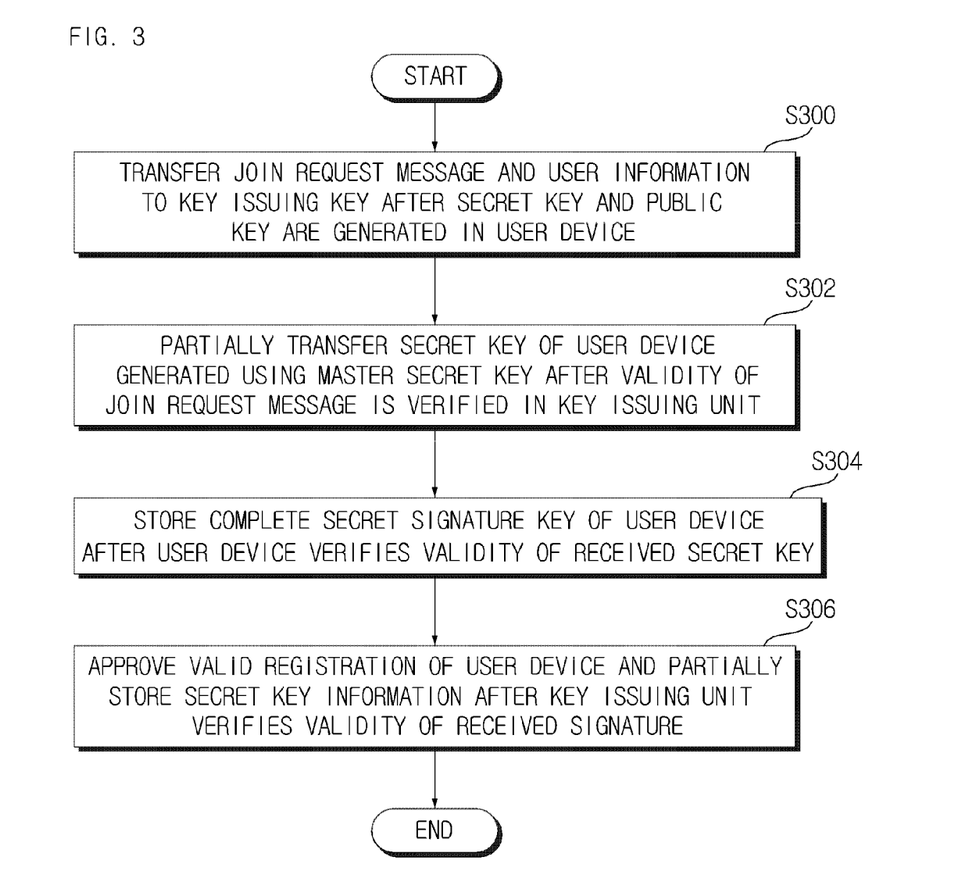
FIG. 3 is an operational control flow chart of interactively generating a signature key between the key issuing unit and user devices according to an exemplary embodiment of the present invention.

FIG. 3 shows an operational control flow of allowing the key issuing unit 110 to interactively generate a signature key with the user device 140 according to the exemplary embodiment of the present invention.

Hereinafter, the process of generating the signature key of the key issuing unit 110 according to the exemplary embodiment of the present invention will be described in detail with reference to FIG. 3.

The user device 140 and the key issuing unit 110 interactively perform the following operations according to the group signature mechanism to be used. Authentication and security channels are formed between the user device 140 and the key issuing unit 110 that are two participants.

The user device 140 selects secret value $z_i \in Z_p^*$ and generates its own public key $C_i = w^{z_i}$ when being newly joined in the group. The user device 140 provides a join request message and user information $(ID_i, u^{z_i}, C_i = w^{z_i}, POP(w, C_i), ZK\text{-}Eq(u, u^{z_i}, w, C_i))$ to the key issuing unit 110 (S300). Herein, it is assumed that the fact that C is a public key generated in a user $ID_i$ can be publicly verified. It is assumed that all the C values are defined as different values for each user. If necessary, two assumptions may be easily implemented by using a binary search. When more than two users want to use the same public key value, the user joined later is not allowed to join and allows the use of other public key values.

The key issuing unit 110 verifies that the user $ID_i$ knows $z_i=\log_w C_i$ by using POP(w, $C_i$) and also verifies $\log_u Y_i=\log_w C_i$ by using zero-knowledge verification of knowledge ZK-Eq(u, $Z_i=u^{z_i}$, w, $C_i$). If the verifications succeed, the key issuing unit 110 selects $x_i, y_i \leftarrow_r \mathbb{Z}_p^*$, calculates $A_i=(g_1 g_2^{-y_i} C_i^{-1})^{1/(\theta-x_i)}=(g_1 g_2^{-y_i} w^{z_i})^{1/(\theta+x_i)}$ by using the master issuing key θ and transfers ($A_i, x_i, y_i$) to the user device 140 (S302).

The user device 140 verifies the validity of ($A_i, x_i, y_i$) and stores a secret key usk[i]=($A_i, x_i, y_i, z_i$) of a group member (S304).

The key issuing unit 110 additionally registers registration information $REG_i=[g^{y_i}, ID_i, C_i=w^{z_i}, POP(w, C_i), X_i=h_1^{x_i}, Y_i=g_2^{y_i}]$ in a user registration list register (REG) (S306).

The methods may support a simultaneous join when using a non-interactive zero-knowledge verification of knowledge.

Figure 4:
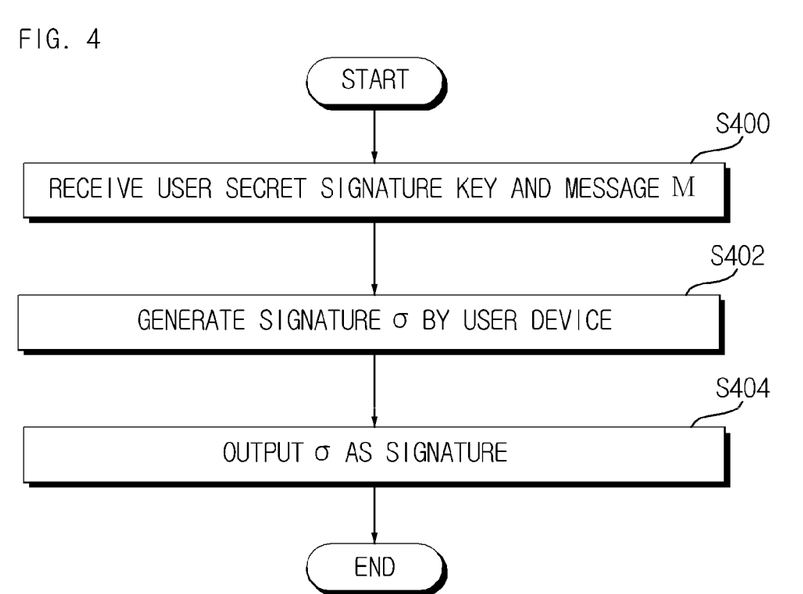
FIG. 4 is an operational control flow of allowing valid user devices to generate a group signature for given messages according to an exemplary embodiment of the present invention.

FIG. 4 is an operational control flow of allowing the valid user device 140 to generate a group signature for given messages according to an exemplary embodiment of the present invention.

Hereinafter, a process of generating the group signature by the valid user device according to the exemplary embodiment of the present invention will be described in detail with reference to FIG. 4.

The user device 140 receives the given group public key (gpk), a user secret signature key usk[i]=(A, x, z, y) corresponding to the group public key, and a message M (S400). Then, the user device 140 generates a signature a for the input as follows.

The user device 140 selects any random number $\alpha \leftarrow Z_p$ and calculates $\gamma=\alpha x-z$ (modp), $D_1 \leftarrow u^\alpha$, $D_2 \leftarrow Aw^\alpha$, and $D_3 \leftarrow g^\gamma d^\alpha$. The user device 140 selects a plurality of any random numbers $r_\alpha, r_x, r_\gamma, r_y \leftarrow Z_p$ and calculates $R_1 \leftarrow u^{r_\alpha}$, $R_2 \leftarrow e(D_2, h_1)^{r_x} e(w, h_\theta)^{-r_\alpha} e(w, h_1)^{-r_\alpha} e(g_2, h_1)^{r_y}$, and $R_3 \leftarrow g^{r_y} d^{r_\alpha}$.

The user device 140 calculates $c=H(M, D_1, D_2, D_3, R_1, R_2, R_3)$ by using the hash function H and calculates $s_\alpha=r_\alpha+c\alpha$ (modp), $s_x=r_x+cx$(modp), $s_\gamma=r_\gamma+c\gamma$(modp), and $s_y=r_y+cy$ (modp) (S402). Then, the user device 140 outputs $\sigma=(D_1, D_2, D_3, c, s_\alpha, s_x, s_\gamma, s_y)$ as a signature (S404).

Figure 5:
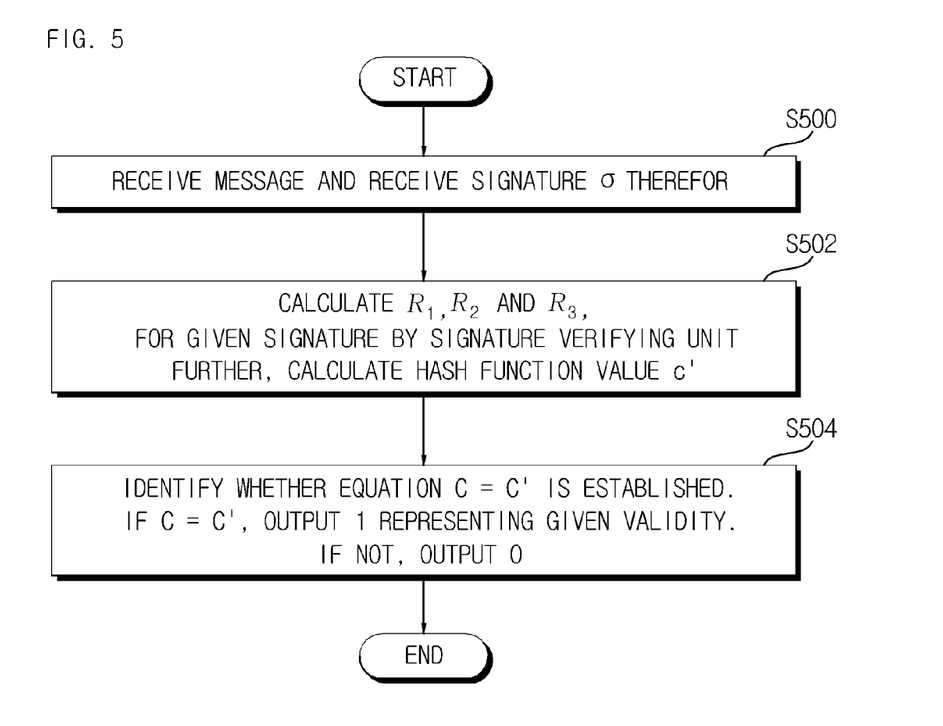
FIG. 5 is an operational control flow chart of verifying a group signature for one message, which is generated by valid user devices, by a signature verification unit according to the exemplary embodiment of the present invention.

FIG. 5 is an operational control flow chart of verifying a group signature for a message, which is generated by valid user devices 140, by the signature verifying unit 150 according to the exemplary embodiment of the present invention.

Hereinafter, a process of verifying the signature verifying unit 150 according to the exemplary embodiment of the present invention will be described in detail with reference to FIG. 5.

It is assumed that the signature for the message M is previously generated (S500). The signature verifying unit 150 for the given signature calculates $R_1 \leftarrow u^{s_\alpha} D_1^{-c}$, $R_3 \leftarrow g^{s_y} d^{s_\alpha} D_3^{-c}$, and $R_2 \leftarrow e(D_2, h_1)^{s_x} e(w, h_\theta)^{-s_\alpha} e(w, h_1)^{-s_y} e(g_2, h_1)^{s_z} (e(D_2, h_\theta)/e(g_1, h_1))^c$. The signature verifying unit 150 calculates a hash function value $c'=H(M, D_1, D_2, D_3, R_1, R_2, R_3)$ and then, identifies whether c is equal to c' (S502). As the identified result, if two values are equal to each other, the signature verifying unit 150 outputs 1 representing that the given signature is valid. If not, 0 is output (S504).

Figure 6:
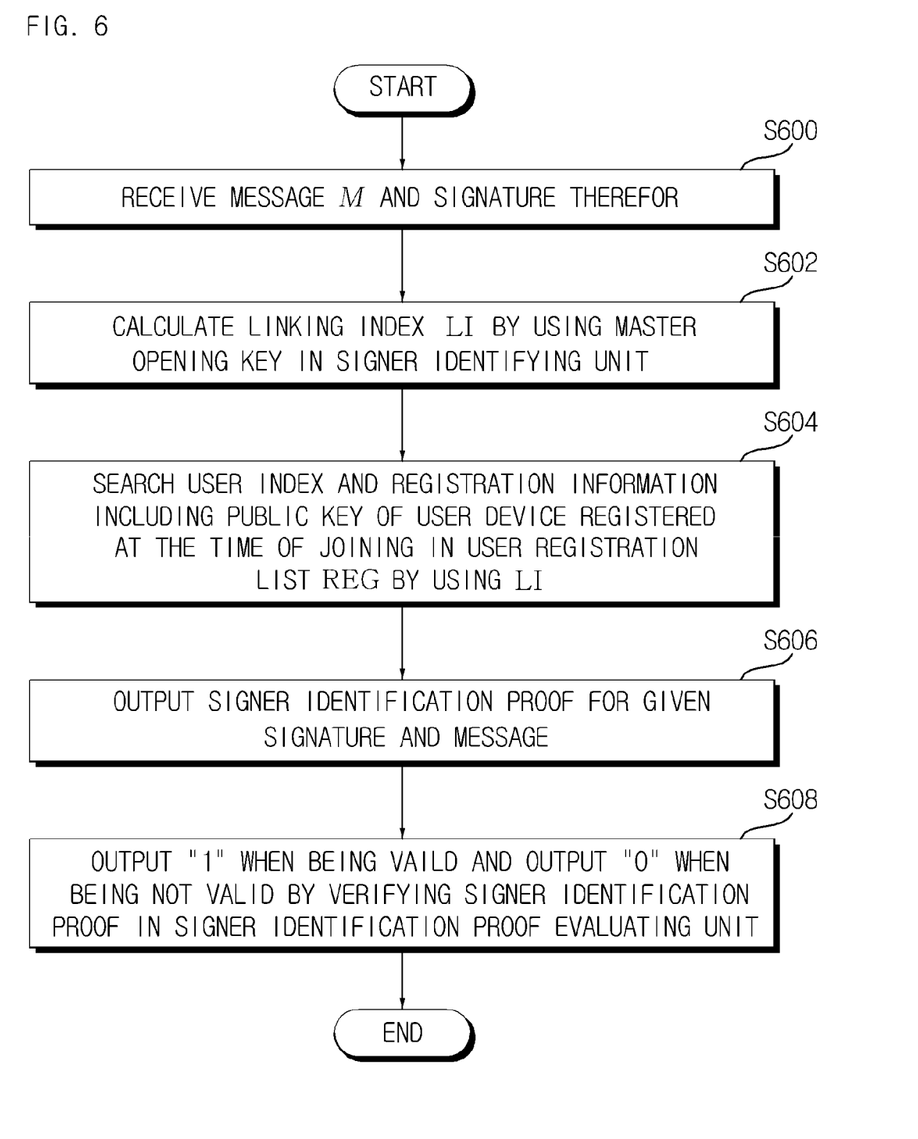
FIG. 6 is an operational control flow chart of generating verification information on a group signature for a message generated by the valid user devices and verifying validity of the verification information according to the exemplary embodiment of the present invention.

FIG. 6 is an operational control flow chart of generating a signer identification proof identifying who is a real signer of a group signature for a message generated by the valid user device 140 by using the master opening key and verifying the validity of the signer identification proof by using the signer identification proof evaluating unit 160 according to the exemplary embodiment of the present invention.

Hereinafter, a process of verifying the validity of the verification information by the signer identification proof evaluating unit 160 according to the exemplary embodiment of the present invention will be described in detail with reference to FIG. 6.

It is assumed that a valid signature $\sigma=(D_1, D_2, D_3, c, s_\alpha, s_x, s_\gamma, s_y)$ for the message M is previously given (S600). The signer identifying unit 120 generates the verification information τ by using the master opening key mok=(η, ξ) as follows.

The signer identifying unit 120 calculates $LI=D_3 D_1^{-\xi}=g^\gamma u^{\xi \alpha} \cdot (u^\alpha)^{-\xi}=g^\gamma$ (S602).

Then, the signer identifying unit 120 searches a user index i and information $REG_i=[g^{y_i}, ID_i, C_i=w^{z_i}, POP(w, C_i), X_i=h_1^{x_i}, Y_i=g_2^{y_i}]$ corresponding thereto by the binary search in the user registration list REG by using $g^\gamma$. Herein, upk[i]= $C_i=w^{z_i}$ is information registered by the public key of the signer when the signer is joined (S604). The signer identifying unit 120 calculates $K=D_1^\eta=u^{\alpha\eta}$ and $A_i=A_i u^{n\alpha} (u^\alpha)^{-\eta}=D_2 K^{-1}$ and verifies that Equation $e(A_i, X_i h_\theta)=e(g_1 Y_i^{-1} C_i^{-1}, h_1)$ is established (S606). If the verification equation is valid, the signer identifying unit 120 selects $r \leftarrow \mathbb{Z}_p^*$ and calculates $c_{open}=H(M_{open}, \sigma, g, K, u^r, D_1^r)$ and $s_{open}=r-c_{open}\eta$ (mod p). Here, $M_{open}$ is a message for identifying the signer. The signer identifying unit 120 outputs the signer identification proof $\tau=(K, s_{open}, c_{open})$ corresponding to the $IDi$, the public key $C_i=w^{z_i}$, and the signature σ of the signer (S608).

The signer identification proof evaluating unit 160 evaluates if the valid signature $\sigma=(D_1, D_2, D_3, c, s_\alpha, s_x, s_\gamma, s_y)$ for the given message M, the signer identification proof upk[i]= $C_i=w^{z_i}$ and $\tau=(K, s_{open}, c_{open})$, and the public key upk[i] of the given signer meets the following conditions.

(1) The signer identification proof evaluating unit 160 calculates $W_1=u^{s_{open}} w^{c_{open}}=u^r, W_2=D_1^{s_{open}} K^{r_{open}}=D_1^r$, and the hash function value $c_{open}'=H(M_{open}, \sigma, g, K, W_1, W_2)$ and identifies that $c_{open}'=c_{open}$ is established and also identifies that (2) $c(D_2 K^{-1}, X_i h_\theta)=c(g_1 g_2^{-y_i} C_i^{-1}, h_1)$ is established.

If both of the Equations (1) and (2) are established, the signer identification proof evaluating unit 160 outputs 1 representing the validity. If not, 0 is output (S608).

Figure 7:
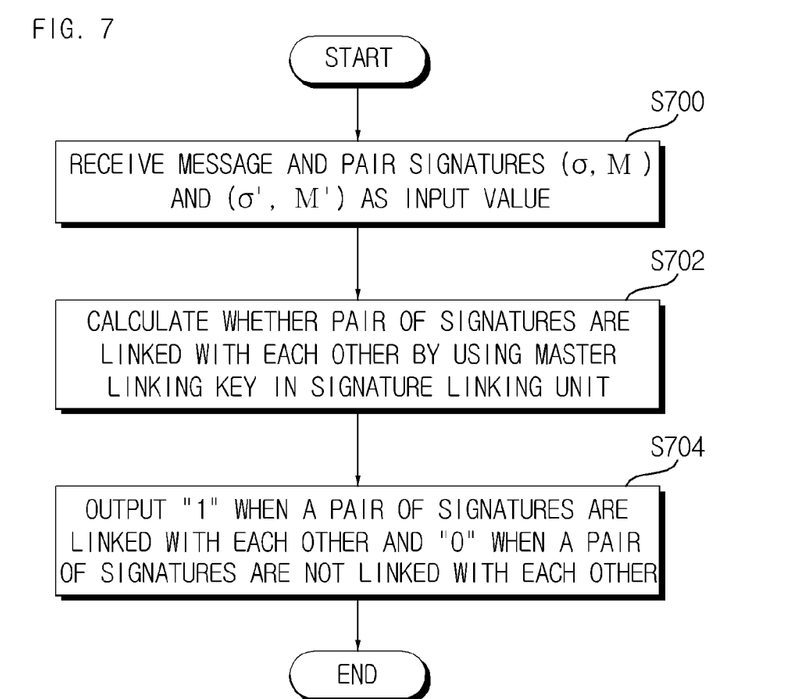
FIG. 7 is an operational control flow chart of outputting results on whether group signatures are linked with each other by using a master linking key for two group signatures generated by the valid user devices according to the exemplary embodiment of the present invention.

FIG. 7 is an operational control flow chart of confirming whether the group signatures are linked with each other by using a master linking key for two group signatures generated by the valid user device 140 according to the exemplary embodiment of the present invention.

Hereinafter, a process of identifying on the linking of group signatures of two group signatures according to the exemplary embodiment of the present invention will be described in detail with reference to FIG. 7.

The signature linking unit 130 receives the given massage-signature pair (σ, M) and (σ', M') (S700) and calculates two linking indexes LI and LI' as follows by using the master linking key $mlk=L=h_1^\xi$ (S702). Here, it is assumed that $\sigma=(D_1, D_2, D_3, \ldots)$ and $\sigma'=(D_1', D_2', D_3', \ldots)$ and $LI=e(D_3, h_1)e(D_1, L)=e(g^\gamma, h_1)$ and $LI'=e(D_3', h_1)e(D_1', L)=e(g^{\gamma'}, h_1)$. The signature linking unit 130 outputs 1 when LI=LI' and if not, outputs 0 (S704).

Figure 8:
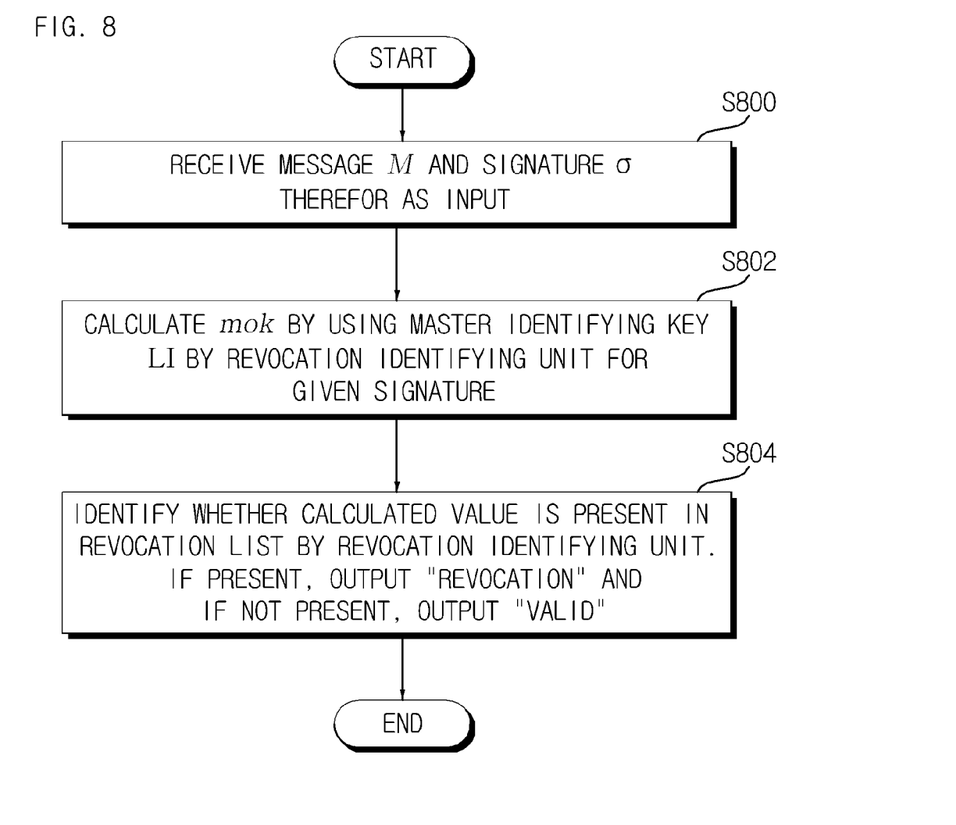
FIG. 8 is an operational control flow chart of outputting related results by a signer identifying unit when requesting revocation identification for a given signature according to the exemplary embodiment of the present invention.

FIG. 8 is an operational control flow chart of allowing the signer identifying unit 120 to update the related information in the revocation list (RL) when the revocation is generated and outputting results when the revocation is requested, according to the exemplary embodiment of the present invention.

Hereinafter, the process of outputting processed results at the time of receiving the revocation identification request by the signer identifying unit 120 will be described in detail with reference to FIG. 8, according to the exemplary embodiment of the present invention.

The valid signature $\sigma=(D_1, D_2, D_3, c, s_\alpha, s_x, s_y, s_y)$ for the message M is previously given as an input (S800). The signer identifying unit 120 identifies whether the revocation of the key generating the signature given as follows is performed by using the master opening key $mok=(\eta, \xi)$.

The signer identifying unit 120 calculates $LI=D_3$ $D_1^{-\xi}=g^y u^{\xi\alpha} \cdot (u^\alpha)^{-\xi}=g^y$ (S802). The signer identifying unit 120 identifies whether the calculated value is present in the revocation list (RL). The signer identifying unit 120 outputs the 'revocation' when the calculation value is present and outputs 'valid' when the calculation value is not present (S804).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A lightweight group signature system with short signatures, comprising:
   a user device including a processor executing a first plurality of computer program instructions stored on a non-transitory computer-readable media, wherein executing the first plurality of computer program instructions causes the user device to generate a group signature using a signature key;
   a signature control unit including one or more processors executing a second plurality of computer program instructions stored on one or more non-transitory computer-readable media, wherein executing the second plurality of computer program instructions causes the signature control unit to:
      generate, using a group public key, a plurality of master keys including a master issuing key, a master linking key, and a master opening key, each key of the plurality of master keys being different from every other key of the plurality of master keys,
      when validity of a join request message generated from the user device is verified, generate the signature key using the master issuing key, issue the signature key to the user device, store the signature key in a signature key management list, and update a revocation list,
      when an identify signature linking request including two group signatures is received, identify, using the master linking key and without identifying a signer of either of the two group signatures, whether the two group signatures are linked,
      manage the revocation list to perform revocation, and
      when a signer identification request is received, generate, using the master opening key, a signer identification proof of a valid group signature;
   a signature verifying unit including a processor executing a third plurality of computer program instructions stored on a non-transitory computer-readable media, wherein executing the third plurality of computer program instructions causes the signature verifying unit to verify a group signature; and
   a signer identification proof evaluating unit including a processor executing a fourth plurality of computer program instructions stored on a non-transitory computer-readable media, wherein executing the fourth plurality of computer program instructions causes the signer identification proof evaluating unit to evaluate the validity of the signer identification proof generated from the signature control unit,
   wherein generating the plurality of master keys includes:
      generating a first bilinear group and a second bilinear group;
      generating a bilinear map from the first bilinear group and the second bilinear group to a third bilinear group;
      generating a hash function;
      selecting first through fourth elements of the first bilinear group;
      selecting an element of the second bilinear group;
      selecting a first value, a second value, and a third value from the set of integers; and calculating $h_\Theta = h_1^\Theta,$ $w = u^\eta,$ $d = u^\xi,$ $L = h_1^\xi,$ $mik = \Theta,$ $mok = (\eta, \xi),$ and $gpk = (e, G_1, G_2, G_T, g, g_1, g_2, h_1, h_\Theta, H, u, w, d),$ wherein $\Theta$ is the first value, e is the bilinear map, $G_1$ is the first bilinear group, $G_2$ is the second bilinear group, $G_T$ is the third bilinear group, g is the first element of the first bilinear group, $g_1$ is the second element of the first bilinear group, $g_2$ is the third element of the first bilinear group, u is the fourth element of the first bilinear group, $h_1$ is the element of the second bilinear group, H is the hash function, $\eta$ is the second value, $\xi$ is the third value, L is the master linking key, mik is the master issuing key, mok is the master opening key, and gpk is the group public key.

2. The lightweight group signature system of claim 1, wherein the signature control unit provides the group public key to all the participants including the user device.

3. The lightweight group signature system of claim 1, wherein the signature control unit verifies the validity of a join request message when receiving the join request message from the user device to be registered in the lightweight group signature system and then, issues the signature key to the user device.

4. The lightweight group signature system of claim 3, wherein the join request message includes personal key ownership verification information and verification information related to key issuance.

5. The lightweight group signature system of claim 1, wherein a security channel for authentication is formed between the key issuing unit and the user device.

6. The lightweight group signature system of claim 1, wherein the key issuing unit changes a session at the time of generating a revocation list of issued signature keys and makes public the revocation list to be used to update the group public key and a user secret key.

7. A computer-implemented lightweight group signature method, comprising:
generating, using a processor, a group public key;
generating, using the group public key, a master issuing key, a master opening key, and a master linking key, each key being different from each other key;
when a join request message and associated user information is received, verifying the validity of the user information and when the user information is valid, generating a signature key using the master issuing key and the user information and issuing the signature key, wherein the signature key is adapted to generate a group signature when the signature key is used to sign a message;
when an identify signature linking request including a first group signatures and a second group signature is received, identifying whether the first and second group signatures are linked by determining, using the master linking key and without determining a signer of the first or second group signatures, whether the first and second group signatures were each generated using a same signature key; and
when a signer identification request is received, determining, using the master opening key and a group signature included in the signer identification request, a signer of the included group message,
wherein generating the signature key includes:
selecting first and second integers $x_i$ and $y_i$ at random from $\mathbb{Z}$; and
calculating $$A_i = (g_1 \cdot g_2^{-y_i} \cdot C_i^{-1})^{1/(\Theta - x_i)},$$

wherein $\mathbb{Z}$ is the set of integers, $g_1$ and $g_2$ are components of the group public key, $C_i$ is a public key included in the user information, $\Theta$ is the master issuing key, and the signature key includes $A_i$, $x_i$, and $y_i$.

8. The lightweight group signature method of claim 7, further including identifying whether the first and second group signatures are linked without determining a signature key used to generate the first or second group signature.

9. The lightweight group signature method of claim 7, wherein when an identify revocation request is received, determining, using the master opening key, a signature key used to generate a group signature included in the identify revocation request, and determining whether the determined signature key or information associated therewith is present in a revocation list.

10. The lightweight group signature method of claim 7, wherein the group public key is defined using bilinear groups, a bilinear map associated with the bilinear groups, and a hash function.

11. The lightweight group signature method of claim 7, wherein the user information includes personal key ownership verification information.

12. A computer-implemented lightweight group signature method, comprising:
generating, using a processor, a group public key;
generating, using the group public key, a master issuing key, a master opening key, and a master linking key, each key being different from each other key;
when a join request message and associated user information is received, verifying the validity of the user information and when the user information is valid, generating a signature key using the master issuing key and the user information and issuing the signature key, wherein the signature key is adapted to generate a group signature when the signature key is used to sign a message;
when an identify signature linking request including a first group signatures and a second group signature is received, identifying whether the first and second group signatures are linked by determining, using the master linking key and without determining a signer of the first or second group signatures, whether the first and second group signatures were each generated using a same signature key; and
when a signer identification request is received, determining, using the master opening key and a group signature included in the signer identification request, a signer of the included group message,
wherein generating the group public key includes:
generating a first bilinear group and a second bilinear group,
generating a bilinear map from the first bilinear group and the second bilinear group to a third bilinear group,
generating a hash function,
selecting first through fourth elements of the first bilinear group,
selecting an element of the second bilinear group,
selecting a first value, a second value, and a third value from the set of integers, and calculating:

$$h_\Theta = h_1^\Theta,$$

$$w = u^\eta,$$

$$d = u^\xi, \text{ and}$$

$$gpk = (e, G_1, G_2, G_T, g, g_1, g_2, h_1, h_\Theta, H, u, w, d),$$

wherein $\Theta$ is the first value, $\eta$ is the second value, $\xi$ is the third value, $e$ is the bilinear map, $h_1$ is the element of the second bilinear group, $G_1$ is the first bilinear group, $G_2$ is the second bilinear group, $G_T$ is the third bilinear group, $g$ is the first element of the first bilinear group, $g_1$ is the second element of the first bilinear group, $g_2$ is the third element of the first bilinear group, $u$ is the fourth element of the first bilinear group, H is the hash function, and gpk is the group public key; and
generating the plurality of master keys includes calculating:

$$L = h_1^\xi,$$

$$mik = \Theta, \text{ and}$$

$$mok = (\eta, \xi),$$

wherein L is the master linking key, mik is the master issuing key, and mok is the master opening key.

* * * * *